(12) United States Patent
Novotny et al.

(10) Patent No.: US 6,603,713 B1
(45) Date of Patent: Aug. 5, 2003

(54) OPTICAL DISK DRIVES WITH THERMOMAGNETIC WRITING AND MAGNETORESISTIVE READING

(75) Inventors: Vlad J. Novotny, Milpitas, CA (US); Hossein Moghadam, San Jose, CA (US)

(73) Assignee: Terastor Corporation, Milpitas, CA (US)

(*) Notice: Subject to any disclaimer, the term of this patent is extended or adjusted under 35 U.S.C. 154(b) by 53 days.

(21) Appl. No.: 09/919,358

(22) Filed: Jul. 30, 2001

(65) Prior Publication Data (65)

Related U.S. Application Data

(60) Provisional application No. 60/221,586, filed on Jul. 28, 2000.

(51) Int. Cl.[7] .................................................. G11B 11/00
(52) U.S. Cl. ................................................... 369/13.17
(58) Field of Search ............................ 369/13.17, 13.02, 369/13.01, 13.18, 13.19, 13.2, 13.21, 13.13, 13.33, 13.32, 13.24, 112.01, 112.24, 126, 300; 360/317

(56) References Cited

U.S. PATENT DOCUMENTS

| | | | |
|---|---|---|---|
| 5,986,978 A | 11/1999 | Rottmayer et al. | 369/13.17 |
| 6,016,290 A * | 1/2000 | Chen et al. | 369/13.17 |
| 6,243,288 B1 | 6/2001 | Ishikawa et al. | 365/158 |
| 6,243,350 B1 | 6/2001 | Knight et al. | 369/126 |
| 6,307,818 B1 * | 10/2001 | Jerman et al. | 369/13.17 |
| 6,507,540 B1 * | 1/2003 | Berg et al. | 369/13.13 |

* cited by examiner

Primary Examiner—Ali Neyzari
(74) Attorney, Agent, or Firm—Fish & Richardson P.C.

(57) ABSTRACT

Techniques and devices based on second surface optical recording using thermomagentic writing in a magneto-optic recording layer and first surface magnetic reading of written data in the recording layer.

17 Claims, 5 Drawing Sheets

OPTICAL DISK DRIVES WITH THERMOMAGNETIC WRITING AND MAGNETORESISTIVE READING

This application claims the benefit of U.S. Provisional Application No. 60/221,586 filed on Jul. 28, 2000.

BACKGROUND

This application relates to optical data storage, and more particularly, to optical data storage based on magneto-optic materials.

Various optical storage devices and systems have been developed. One type of optical storage systems use an optical head to focus a monochromatic optical beam to a small spot on a recording layer of a storage medium for reading or writing data. The optical head may be positioned over the medium by a spacing greater than one wavelength, i.e., in a "far-field" optical configuration, where the optical energy is coupled between the optical head and the medium by light propagation. An optical head with a large numerical aperture can produce a small spot size. The diffraction effect in light propagation, however, limits the numerical aperture to less than unity. The areal density of such an optical storage device, hence, is limited by this diffraction-limited spot size which has a lower limit on the order of one half wavelength.

An optical storage system may also be configured to operate in a "near-field" configuration to achieve an areal density for data storage higher than that of the far-field configuration. In a typical near-field configuration, the optical head is spaced from the optical medium by a distance on the order of or less than one wavelength of the optical energy. The optical coupling between the optical head and the medium, therefore, can be effectuated at least in part by evanescent coupling, with or without light propagation. Some near-field devices couple optical energy through both evanescent coupling and coupling through light propagation. An effective numerical aperture of the optical head in such a near-field configuration can be greater than unity. Hence, a near-field optical storage system can achieve a focused beam spot size much less than one half wavelength and to realize a high areal storage density.

An optical head of an optical storage device or system generally includes an optical interfacing surface through which optical energy is coupled between the optical storage medium and the optical head. A near-field optical storage device may be designed in a "first surface" recording configuration, where the optical storage medium is designed to have the reflective layer formed between the recording layer and the substrate. During reading or writing operation, the optical interfacing surface of the optical head and the recording layer of the medium are located on the same side of the substrate of the medium. Hence, the optical beam is coupled from the optical head to a recording layer, or coupled from the recording layer to the optical head by reflection of the reflective layer, without passing through the substrate that supports the reflective layer, the recording layer, and other layers. The See, e.g., U.S. Pat. No. 6,243, 350 to Knight et al. Thus, the substrate may not optically transparent. Because the near-field condition requires the optical interfacing surface of the head to be spaced from the surface of the optical medium by less than one wavelength, the optical head for the near-field first surface recording is designed to focus the optical beam essentially at or near the medium surface to achieve the minimum beam size in the recording layer.

Alternatively, a "second surface" recording may be used as in many far-field optical disk drives, where the optical storage medium is designed to have the recording layer formed between the reflective layer and the optically transparent substrate. During operation, the optical head and the recording layer are located on opposite sides of the substrate. Hence, the optical energy coupled between the optical head and the recording layer transmits through the substrate.

DETAILED DESCRIPTION

Figure 1:
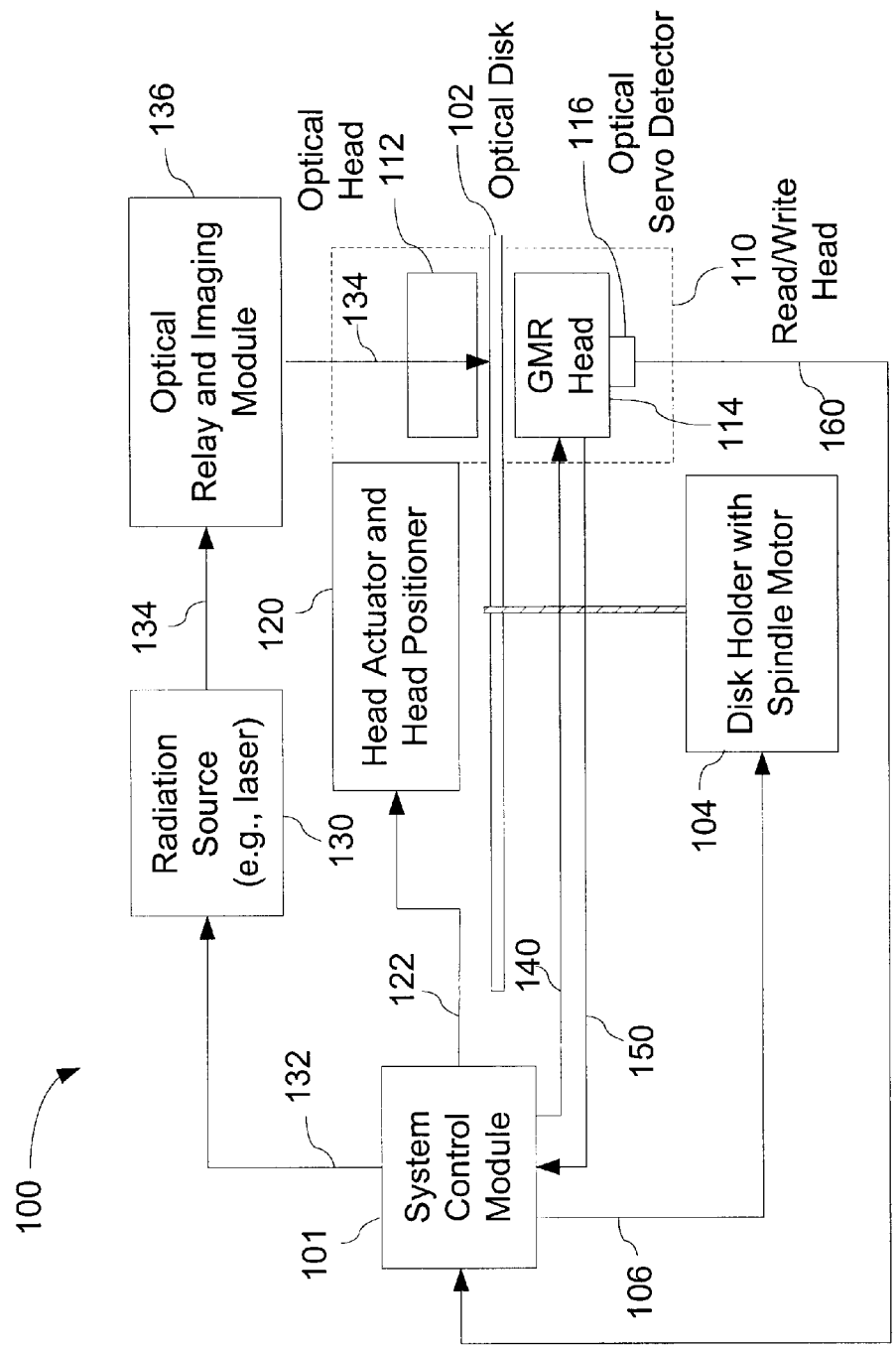
FIG. 1 shows one embodiment of an optical disk drive having a hybrid read/write head designed for optical second surface recording and magnetic first surface reading.

In general, the optical disk drives of this application use the second-surface recording in either the optical far-field configuration or the optical near-field configuration. A thick transparent substrate is used to place the substrate surface facing the optical head sufficiently away from the recording layer formed on the opposing substrate surface to make the image of the beam on that substrate surface out of focus. The optical intensity on that substrate surface is small due to the large unfocused beam cross section to maintain the thermal heating on that substrate surface below a threshold level where thermal-induced effects such as the spot formation on the optical head no longer adversely affect the normal operation of the storage device. The transparent substrate facing the optical head is designed to have a flat and smooth surface to eliminate adverse effects associated with flying the optical head over the conventional grooved substrate surface.

The read/write head for the present disk drives is a combination of an optical head for writing data in the second surface configuration and a magnetic head for reading data in the first surface configuration. The optical writing head operates to focus a laser beam onto the magneto-optic recording layer to locally heat up a magnetic recording bit domain above its Curie temperature while an inductive writer, positioned adjacent to the heated bit domain, produces a magnetic field to change the magnetic state of that bit domain to write the data. The strength of the magnetic field produced from the inductive writer is limited below a value so that it cannot change the magnetic state of each bit domain without the local heating by the optical beam. Since the laser beam can be focused to a small area, generally less than the spatial resolution of the inductive writer, a higher areal data density can be achieved through such optical writing than that written directly by an inductive writer with a sufficiently strong magnetic field. This process is often referred to as thermomagnetic writing because the writing part is in fact achieved by the magnetic field from the inductive writer while the optical beam is used to spatially select a bit domain to be written and to activate the bit domain by optical heating. Hence, the spatial writing resolution is limited by the focused optical beam size.

Certainly, using the optical beam for readout can also resolve the writing resolution. In general, a reflected optical signal from the optical disk can be used to extract the optical servo information and the data embedded in the MO signal. However, the reflected optical signal is subject to various noise due to factors such as the structure of the disk, contamination, debris, or defects on the disk surface and the optical head, or optical reflections at various surfaces. Such noise is particularly problematic in the optical near-field configuration. As result, the actual signal-to-noise ratios (SNRs) in the optical detection can be seriously degraded and hence affect the performance of the disk drive.

The magnetic reading head in the present hybrid read/write head is used here to obviate the noise issue associated with the optical readout. In particular, a giant magneto-resistive ("GMR") reading head is used to reduce the readout noise while maintaining the capability of reading out at the spatial resolution defined by the focused optical beam during the thermomagnetic writing process. The GMR reading head is located on the opposite side of the disk with respect to the optical head. This hybrid design combines the high density of the optical-assisted thermomagnetic writing and the reliability of the GMR reading in a single disk drive.

Notably, the present disk drives use an optical transmission of the optical beam from the optical head through the optical disk to extract the servo and tracking information during both thermomagnetic writing and the GMR reading processes. The intensity of the optical beam is controlled at a high level to raise the local temperature above the Curie temperature during the thermomagnetic writing process and at a low level, insufficient to raise the local temperature above the Curie temperature, during the GMR reading process. The disk is designed to have servo and tracking patterns that can interact with the optical beam to produce servo and tracking signals for controlling the radial and tangential positioning information. If the multi-layer recording stack is not sufficiently transparent, special transparent slots with such servo and tracking patterns may be formed to produce the servo and tracking signals in the transmitted optical beam. An optical waveguide is specially designed in the hybrid read/write head to receive the transmitted light from the disk and directs the transmitted light to an optical servo detector.

FIG. 1 illustrates one embodiment of an optical storage system 100 with a hybrid read/write head 110 for the second surface optical recording and first surface magnetic reading. The hybrid head 110 includes an optical head 112 on one side of an optical disk 102 and a GMR head 114 on the opposite side of the disk 102. The GMR head 114 includes a GMR reading head and an inductive writer in alignment with the optical head 112. An optical servo detector 116, e.g., a split detector with two equal sensing areas, is coupled to the GMR head 114 to receive the transmitted light from the disk 102.

A disk holding unit 104 holds the optical disk 102 in contact with the optical head 112 during operation for coupling optical energy between the optical head 112 and the disk 102. The optical disk 102 may be a removable medium or a fixed medium. The disk holding unit 104 includes a spindle for holding the disk 102 and a spindle motor that rotates the disk 102 around the spindle at a desired speed. A disk load and unload unit may also be included when the disk drive 100 is the removable type in which a disk can be removed and a different disk can be loaded.

The optical system 100 includes an actuator 120 to hold and move the hybrid head 110 over desired positions of the disk 102 for reading or writing data. The actuator 120 includes a mechanism to move laterally the head 110 as a whole over the disk 102 to select a desired data track and a micro positioning mechanism to along the GMR head 114 and the optical head 112 relative to each other. Either a linear actuator or a rotary actuator may be used.

A radiation source 130 such as a laser produces a beam 134 at a specified wavelength. An optical relay and imaging module 136 directs the beam 134 to the optical head 112. The optical disk 102 includes at least one storage layer for data storage. The storage layer is formed of a suitable material such as a magneto-optical material for magnetic field modulation ("MFM") recording. Data is spatially distributed and stored in the storage layer by a suitable encoding method.

A system control 101 is used to control the operations of various parts of the system 100. The control 101 generates a control signal 122 to control the operation of the actuator 120 a laser control signal 132 to control the laser 130. It also produces a writing signal 140 to the inductive writer in the GMR head 114 for writing data into the disk 102. The GMR reading head in the GMR head 114 sends out a readout signal 150 to the control 101. The control 101 is connected to receive the signal 160 from the optical servo detector 116 that includes the servo and tracking information. The control unit 101 may also control one or more beam-steering devices in the module 136 that control the direction of the beam to the optical head 112 in response to the tracking error signal. Furthermore, the control unit 101 may produce a control signal 184 to control the operations of the disk holder 106 such as loading, unloading, and spinning the disk 102 with the spindle motor.

Figure 2:
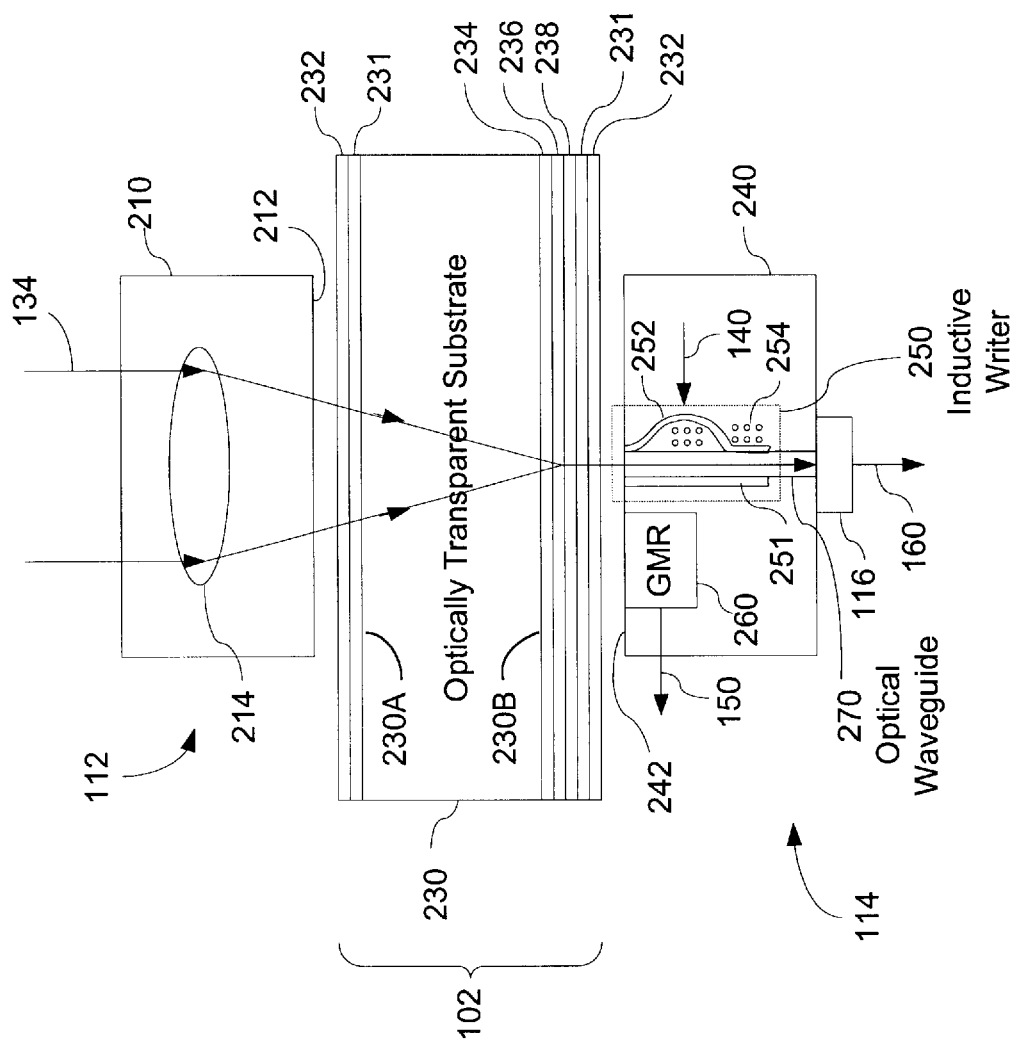
FIG. 2 shows one embodiment of the hybrid read/write head in FIG. 1 and a second surface optical disk.

FIG. 2 illustrates one embodiment of the hybrid head 110 and the structure of the disk 102. The optical head 112 may be a flying head with a slider carrier 210 and an air-bearing surface 212 for lifting the head 112 above the disk 102 due to the aerodynamic interaction with the spinning disk 102. A lens 214, which may be a single lens or a lens combination, is engaged in the carrier 210 to focus input light beam 134 to the recording layer in the disk 102. This flying optical head may operate in either the near-field configuration or the far-field configuration. Alternatively, the optical head 112 may be a non-flying servo head in a far-field configuration with a two-dimensional positioner to adjust the beam along both radial and the tangential directions.

Figure 3:
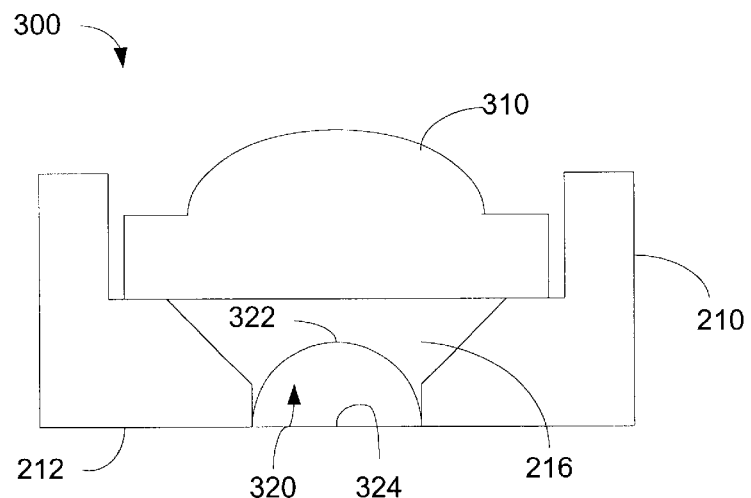
FIG. 3 shows one embodiment of the optical head within the hybrid read/write head.

FIG. 3 shows one flying head design 300 for the optical head 112. The optical head 300 includes an objective lens 310 and a coupling lens 320 to couple the beam to the disk 102. The head carrier 210 is used to hold the objective lens 310 and the coupling lens 320 relative to each other. The objective lens 310 and the coupling lens 320 are spatially fixed to the head carrier 210 and have predetermined spacing from each other. Alternative implementations may use an focusing actuator to finely adjust the spacing between the objective lens 310 and the coupling lens 320. The carrier 210 is configured to have an optical transparent path 216 where the lenses 310 and 320 are placed. The bottom surface 212 of the carrier 210 is the air-bearing surface and may be made from or coated with a wear resistant glass or ceramic material.

The coupling lens 320 may be made of a high-index optical material to produce a large effective numerical aperture ("NA"), i.e., NA=n sin $\theta_0$, where n is the refractive index of the coupling lens 320 and $\theta_0$ is the maximum ray angle from the coupling lens 320 to the focus point. For example, a solid immersion lens ("SIL") or a graded index lens ("GRIN lens") may be used as the coupling lens 320 to a NA greater than unity in the near-field configuration. In the illustrated embodiment, the coupling lens 320 is shown to be a SIL with a spherical optical surface 322 and the opposing second interfacing surface 324. Details of the coupling lens 230 for near-field operation may be found in the aforementioned U.S. Pat. No. 6,243,350. In the present system shown in FIGS. 1 and 2, the near-field configuration requires three conditions to be met. First, the total effective numerical aperture of the optical head 112 is greater than unity. Second, the air gap between the optical head 112 and the disk 102 is less than one wavelength of the light. Third, the refractive index of the transparent substrate 230 should be equal to or greater than the numerical aperture of the optical head 112. Hence, if the numerical aperture of the objective lens 310 is 0.65 and the index of the SIL 320 is 2.0, the NA of the optical head 112 is 0.65×2.0=1.3. As a result, the near-field configuration requires the index of the substrate 230 is at least 1.3. Various glass materials may be used to form the substrate 230.

The disk 102 is designed for the second surface optical recording. An optically transparent substrate 230 has a first flat substrate surface 230A that faces the optical head 112 and a second opposing substrate surface 230B that faces away from the optical head 112. A multi-layer film structure including the MO recording layer 236 is formed over the second substrate surface 230B. Hence, the optical head 112 focuses the beam 134 through the substrate 230 at the recording layer 236.

The thickness of the substrate 230 should be sufficiently large to place the image of the optical beam at the substrate surface 230A out of focus. For example, the substrate 230 may be about 0.5 mm in thickness. This thickness requirement on the substrate 230 may be used to achieve a number of advantages. One example is the reduced localized heating by the optical beam at the SIL and the disk surface. This can reduce the probability of "baking" debris on the optical surfaces and hence cause permanent optical damage and the probability of mass transfer due to adsorption which transfers particles from the disk surface to the bottom surface 324 of the SIL 320. For another example, since the inductive writer for the thermomagnetic writing is placed in the GMR head 114 on the other side of the disk 102, there is no need to fabricate a transparent mesa on the bottom of the optical head 112, e.g., the center of the bottom surface 324 of the SIL 320. This can reduce the probability of damaging the optical head 112 due to incidental head contact and the optical finish of the disk surface.

Notably, the multi-layer film structure over the second substrate surface 230B eliminates the conventional reflective layer in many MO disks because such reflection is no longer necessary. In fact, such reflective layer is purposely eliminated to allow for transmission of the optical beam 134 through the optical disk 102 for optically receiving the servo and tracking information by the optical servo detector 116 located in the GMR head 114. In the illustrated implementation, the film stack includes, in the order of their spatial sequence over the second substrate surface 230B, a thin gold layer 234, the MO recording layer 236, a dielectric layer 238 (e.g., silicon nitride), a protection layer 231 (e.g., a diamond-like film layer), and a lubrication layer 232. The first substrate surface 230A may also be formed with the layers 231 and 232 for protection of both the disk 102 and the optical head 112.

The GMR head 114 in this embodiment includes a slider carrier 240 with an air-bearing surface 242 for flying over the film stack over the second substrate surface 230B. The GMR head 114 includes a GMR reading head 260 and an inductive writer 250 for operation with the optical head 112. The GMR reading head 260 may be implemented in various forms. The basic construction includes a magneto-resistive layer whose electrical resistance changes in response to an external magnetic field. Hence, the resistance of the MR layer may be measured to determine the localized magnetic state of a targeted magnetic bit domain in the recording layer 236. This produces the readout signal 150 that contains data.

The inductive writer 250 is aligned with the optical head 112 so that it directs and focuses the magnetic field at the location in the recording layer 236 where the beam 134 is focused. The inductive writer 250 may generally be any type with one modification: an optical waveguide 270 is formed at the location of the writer 250 where the transmitted optical beam 134 hits. Hence, one end of the optical waveguide 270 is at or near the air-bearing surface 242 to receive the transmitted beam 134 and the other end is connected to the optical servo detector 116. In the illustrated implementation, the inductive writer 250 includes two magnetic poles 251 and 252 that are spaced from each other by a gap. A coil 254 formed around the magnetic pole 252 is used to receive a driving current 140 from the control 101 to produce the desired magnetic field modulation at the selected location in the recording layer 236 to write data. The optical waveguide 270, which may be a fiber or a planar waveguide, is formed in the gap between the poles 251 and 252 to guide the transmitted light to the other end of the slider 240 where the optical servo detector 116 is located. Alternatively, the optical servo detector 116 may be directly placed in the gap between the magnetic poles 251 and 252, without or with the optical waveguide 270. The detector 116 may include a p-n junction device or p-i-n device, a photodiode, or a phototransistor.

Figure 4A:
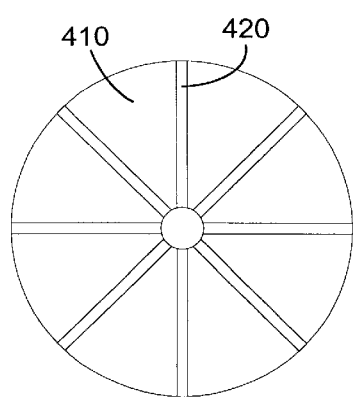
FIGS. 4A, 4B, and 4C show exemplary transparent slit pattern over the optical disk for use in the drive shown in FIGS. 1 and 2 to produce an optical servo beam that transmits through the disk.
Figure 4B:
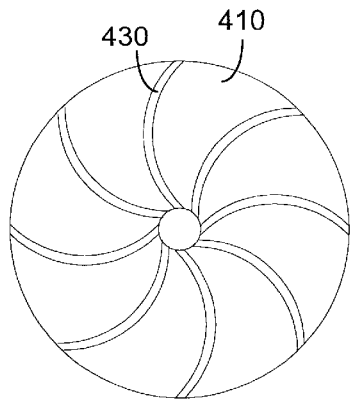
Figure 4C:
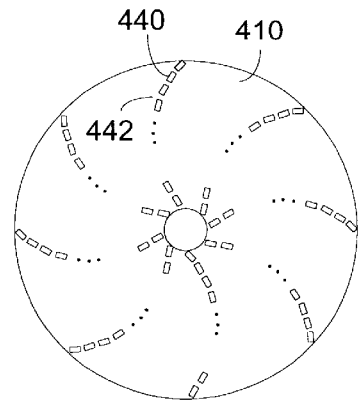

FIGS. 4A, 4B, and 4C show that, periodic transparent servo slits may be formed in the disk 102 when the multi-layer film stack over the second substrate surface 230B is not sufficiently transparent or opaque. Such slits modulate the transmitted optical beam 134 to produce the optical servo and tracking signals. FIG. 4A show straight radial transparent slits 420 that divide the disk 102 into multiple data storage areas 410. FIG. 4A shows a curved radial transparent slits 430. In FIG. 4C, each curved radial transparent slot is formed of alternating transparent areas 440 and opaque areas 442 and has offsets to reduce the air-bearing resonance. The number of transparent slits can be adjusted in accordance with the servo bandwidth of the system 100.

Figure 5:
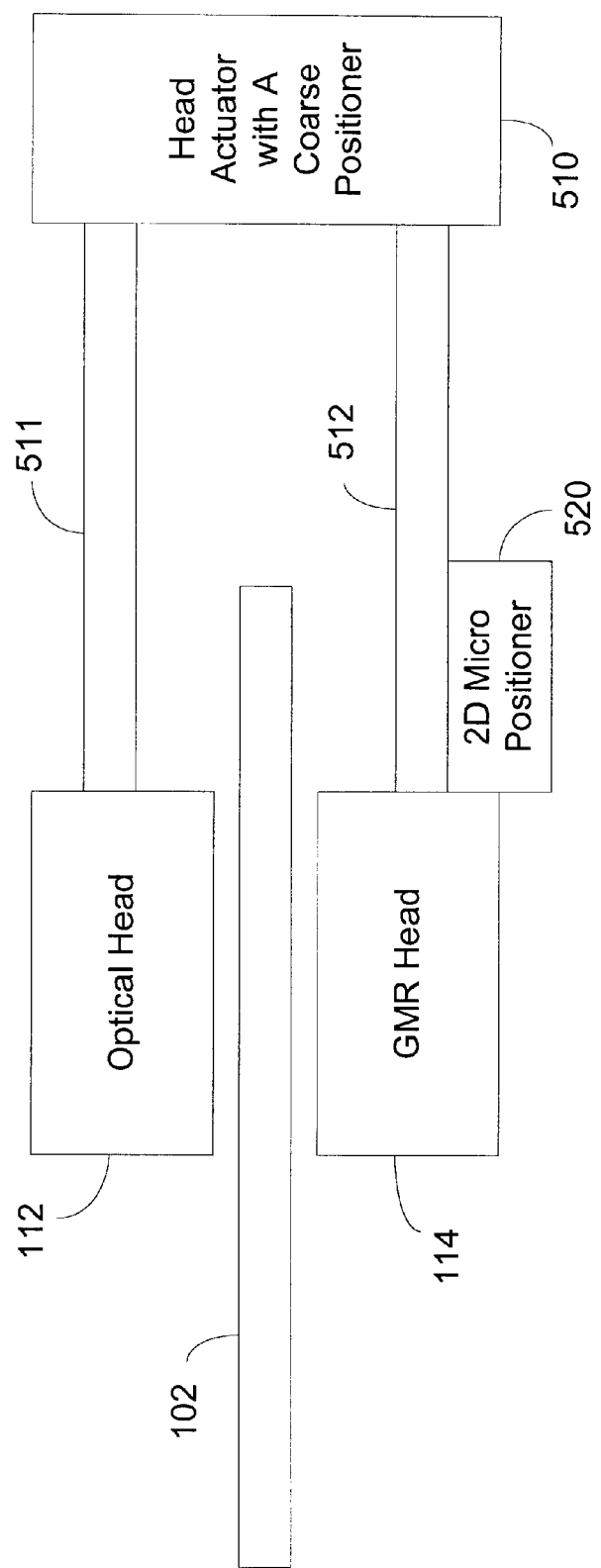
FIG. 5 shows one embodiment of the actuator engagement for holding and controlling positions of the optical head and the magnetic head of the read/write head.

FIG. 5 shows the mechanism for engaging the optical head 112 and the GMR head 114 together to the actuator 120 and for aligning the inductive writer to the optical head 112. The actuator 130 in FIG. 1 may include a head actuator with a coarse positioner 510, a first actuator arm 511 engaging the optical head 112, and a second actuator arm 512 engaging the GMR head 114. Both arms 511 and 512 move with the coarse positioner laterally along the disk surface to place the heads 112 and 114 at a selected location over the disk 102. The arms 511 and 512 are engaged in a way to approximately align the optical head 112 and the inductive writer in the GMR head 114. In addition, a two-dimensional micro positioner 520 is engaged to the GMR head 114 to finely adjust the radial and tangential positions of the GMR head 114 to optically align the inductive writer to the optical head 112.

Figure 6:
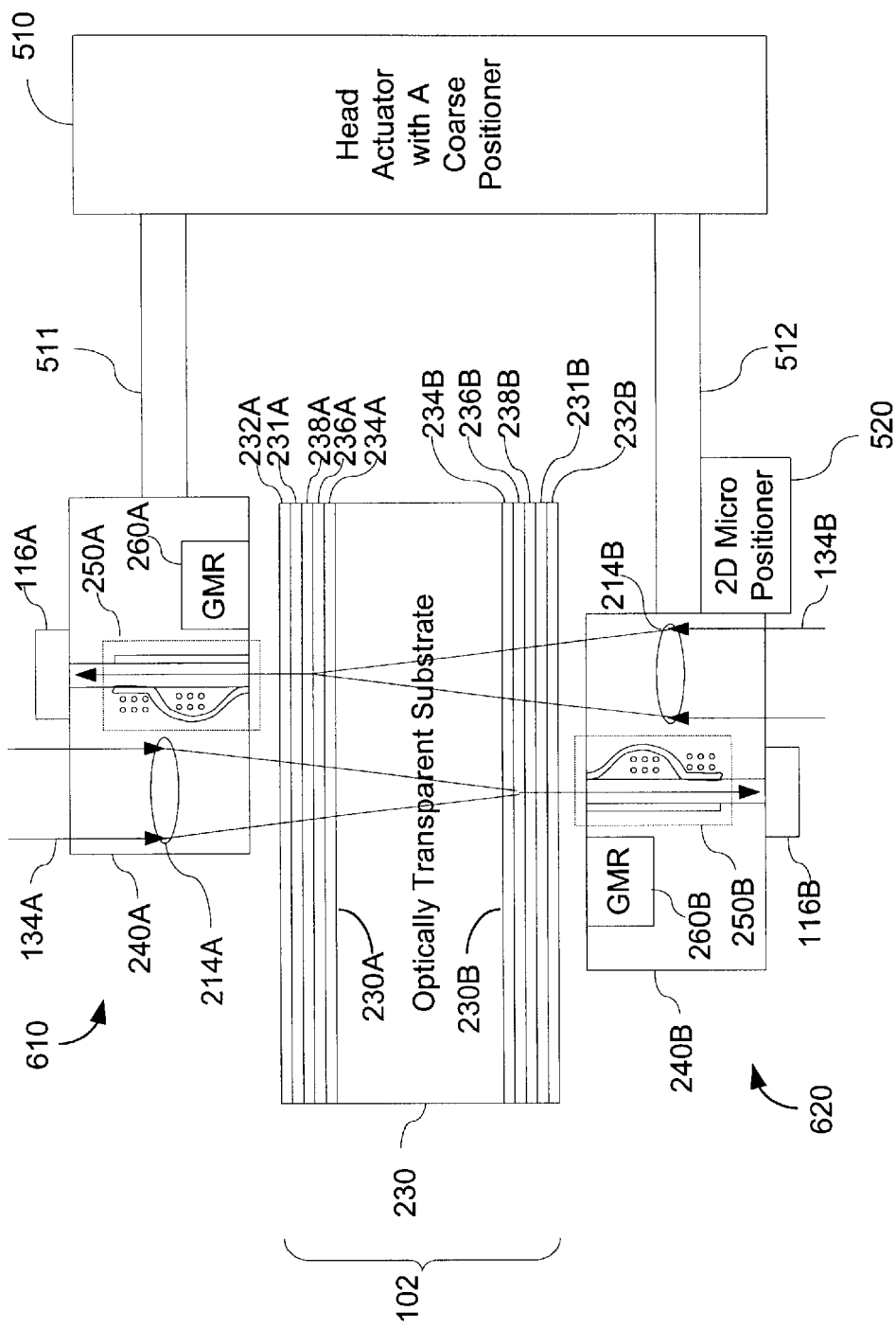
FIG. 6 shows one embodiment of a disk drive that has two relatively-aligned hybrid read/write heads for reading or writing on a disk with two recording layers.

FIG. 6 further shows a dual-layer system based on the system in FIG. 2. The disk 102 is designed to includes two recording layers 236A and 236B, one on the first substrate surface 230A and another one on the second substrate surface 230B. Two identical hybrid heads are mixed in two head units 610 and 620 that are respectively engaged to two actuator arms 511 and 512. The head unit 610 includes the optical head 214A for optically writing to the recording layer 236B, the inductive writer 250A for writing data in the recording layer 236A and the GMR reading head 260A for reading from the recording layer 236A. The head unit 620 is similarly constructed for optically writing in the layer 236A, magnetically writing and reading in the layer 236B.

Only a few embodiments are disclosed. However, it is understood that variations and enhancements may be made without departing from the spirit of and are intended to be encompassed by the following claims.

What is claimed is:

1. A device, comprising:
    a disk holder operable to hold and spin an optical disk, said disk having a transparent substrate having first and second opposing substrate surfaces and a magneto-optic recording layer formed over said second substrate surface and absorbing an optical beam, wherein said disk is partially transparent to said optical beam to produce a transmitted optical beam with servo and tracking information;
    a hybrid head including an optical head operable to couple said optical beam to the optical disk through said first substrate surface, an inductive writer positioned to produce a magnetic field at a location in said recording layer where said optical beam is focused, an optical detector aligned with said optical head to receive said transmitted optical beam from the optical disk, and a magnetic reading header displaced from said inductive writer to read data from the recording layer; and
    an actuator having two actuator arms to move and position said hybrid head to place said optical head over said first substrate surface and to place said inductive writer, said optical detector, and said magnetic reading head over said second substrate surface.

2. The device as in claim 1, wherein said hybrid head includes an optical waveguide having a first end to receive said transmitted optical beam and a second end to deliver said transmitted optical beam to said optical detector.

3. The device as in claim 2, wherein said optical waveguide includes a fiber.

4. The device as in claim 2, wherein said optical waveguide includes a planar waveguide.

5. The device as in claim 1, wherein said first substrate surface is a flat surface.

6. The device as in claim 1, wherein said optical head includes a coupling lens having a first spherical optical surface and a second, opposing optical surface that faces said first substrate surface.

7. The device as in claim 6, wherein said optical head includes an objective lens to couple optical energy to said coupling lens.

8. The device as in claim 6, wherein said coupling lens is a solid immersion lens.

9. The device as in claim 1, wherein said substrate has a thickness to place said first substrate surface out of focus of said optical head.

10. The device as in claim 1, wherein said inductive writer includes two separate magnetic poles, a coil formed around one pole to receive a current to generate a magnetic field.

11. The device as in claim 1, wherein said optical detector is located in a gap between said magnetic poles.

12. The device as in claim 1, further comprising an optical waveguide located in a gap between said magnetic poles to direct said transmitted optical beam to said optical detector.

13. The device as in claim 1, further comprising a positioner engaged to move said inductive writer and said optical detector to align with said optical head.

14. The device as in claim 1, wherein said magnetic reading head includes a giant magneto-resistive sensing element.

15. A method, comprising:
    causing an optical disk to have a transparent substrate with a first flat substrate surface and a second, opposing substrate surface, and a recording layer formed over said second substrate surface, said optical disk is partially transparent;
    causing an optical head to be used to couple an optical beam to the optical disk through said first flat substrate surface to focus light at said recording layer;
    causing an optical detector located on the side of said second substrate surface to receive a transmitted optical beam through the optical disk to extract optical servo and tracking information; and
    causing an inductive writer located on the side of said second substrate surface to produce a magnetic field at a location in said recording layer where said optical beam is focused to record data.

16. The method as in claim 15, further comprising causing a magnetic reading head on the side of said second substrate surface to magnetically read written data in said recording layer.

17. The method as in claim 16, wherein said magnetic reading head includes a giant magneto-resistive sensing element.

* * * * *